United States Patent [19]
Bocinsky, Jr.

[11] Patent Number: 5,371,797
[45] Date of Patent: Dec. 6, 1994

[54] SECURE ELECTRONIC FUNDS TRANSFER FROM TELEPHONE OR UNSECURED TERMINAL

[75] Inventor: Ronald V. Bocinsky, Jr., Woodstock, Ga.

[73] Assignee: Bellsouth Corporation, Atlanta, Ga.

[21] Appl. No.: 5,350

[22] Filed: Jan. 19, 1993

[51] Int. Cl.$^5$ .............................................. H04L 9/32
[52] U.S. Cl. ................................. 380/24; 340/825.34
[58] Field of Search .................................. 380/23–25, 380/825.34

[56] References Cited

U.S. PATENT DOCUMENTS

| | | | |
|---|---|---|---|
| 4,023,013 | 5/1977 | Kinker | 380/24 X |
| 4,123,747 | 10/1978 | Lancto et al. | 380/24 X |
| 4,315,101 | 2/1982 | Atalla | 380/24 X |
| 4,453,074 | 6/1984 | Weinstein | 380/24 X |
| 4,747,050 | 5/1988 | Brachtl et al. | 380/24 X |
| 4,965,568 | 10/1990 | Atalla et al. | 380/24 X |
| 5,168,519 | 12/1992 | Scarinci et al. | 380/6 |
| 5,283,829 | 2/1994 | Anderson | 380/24 |

OTHER PUBLICATIONS

Network Interchange Security Systems User's Manual, Feb. 1991, Published by Atalla Network Security Systems.

*Primary Examiner*—Gilberto Barrón, Jr.
*Attorney, Agent, or Firm*—Jones & Askew

[57] ABSTRACT

A secure electronics funds or other financial transaction system that provides substantially equivalent security to that obtained by the use of secure point of sale terminals such as automatic teller machines, yet is conducted from unsecure terminal devices such as telephones, is disclosed. A customer registers himself or herself personally, together with information on his or her bank account at a secure transaction processor. A secure terminal is used to generate an encrypted version of a personal identification number (PIN) and provides the encrypted PIN and to the secure transaction processor. The encryption key used during encryption of the PIN is also acquired from either a specific request to, or monitoring data passing from a conventional network security transaction processor. The encrypted PIN is parsed with one portion being stored in the customer record at the secure transaction processor and the other being partially masked and provided back to the customer as an access code. Upon conducting a transaction, the customer provides the access code, which is unmasked and concatenated with second portion to recreate the original full encrypted PIN. This, together with the encryption key used for the original encryption is provided to conventional security and transaction processing apparatus for regional banking networks to seek authorization for the transaction.

9 Claims, 4 Drawing Sheets

SECURE ELECTRONIC FUNDS TRANSFER FROM TELEPHONE OR UNSECURED TERMINAL

TECHNICAL FIELD

The present invention relates to systems for electronic funds transfers or payment authorization that employ personal identification numbers (PIN) and in particular, discloses a systems that can meet the security requirements of banking and credit networks while transmitting transaction information from a telephone set or unsecure point of sale terminal.

BACKGROUND OF THE INVENTION

Within the last 20 years there has been an explosive growth in the United States of America of the use of electronic funds transfers. In particular, there has been widespread growth of transfer of funds in the form of dispensing cash from automatic teller machines (ATM). ATM systems typically provide each customer with a card for operating the machine, which card includes a stripe of high magnetic retentivity material on the back for magnetically encoding data identifying the account and the customer, and the like. Since such cards are physically capable of being stolen and used by others, most ATM cash distribution systems have adopted the use of a personal identification number, hereinafter also referred to by its common acronym PIN, that must be provided by the customer in order to effect a transaction using the card.

PINs are typically short alphanumeric strings that can be easily remembered by the individual customer. It is critical for the security of the system, or at least for each particular customer's account, that the PIN not be written down in any fashion where it is accessible to someone who has stolen the card of the bank customer.

As part of the security in a typical ATM transaction system, the PIN is not stored as part of the magnetically coded information on the magnetic stripe of the account card. Therefore, so long as the customer obeys the rule of keeping no written notation of the PIN in the vicinity of the account card, such as in the customer's wallet or purse, there is no effective way for the possessor of a stolen card to illegally obtain cash from the ATM.

As the use of ATMs has grown and banks seeks to provide enhanced services to their customers, a number of ATM authorization networks have been created in the United States of America. These are normally regional networks for which multiple banks are members that are arranged in the following manner. Account maintenance computers for each member bank of the network are connected electronically to a transaction computer run by the operator of the network. This allows the network to obtain inbound access to certain parts of the customer account records for each member bank. The customers of each member bank are notified of the networks of which the bank is a member. Typically, the individual banks will also place logos or other distinctive indicia on their automatic teller machines indicating the particular networks to which its automatic teller machines are connected.

In this way, the customer of any bank that is a member of a network can quickly observe any automatic teller machine where the customer happens to be at a time when he or she is in need of cash. If the machine indicates that the bank operating same is a member of a particular network of which the customer's bank is also a member, the customer can insert the card and execute an ATM transaction at the ATM, irrespective of the identity of the particular bank that owns and operates same. This has provided widespread access to cash from individuals' bank accounts over a widespread geographic area.

The transaction processing computer operated by the network typically assembles information it receives from the ATM and passes it, normally via dedicated telephone links, to the host computer at the bank that maintains the customer's account. This includes an identification of the account, the amount involved and the particular type of transaction requested, and an encrypted representation of the personal identification number input at the ATM. The host computer at the bank then returns data to the network computer indicating whether or not the transaction is authorized. If same is authorized and it is, for example, a cash withdrawal, the account of the customer will be immediately debited at the host computer operated by that customer's bank. The network computer passes the authorization upstream allowing, in the particular example, the ATM to dispense cash to the customer.

Security considerations have led to a number of relatively stringent requirements imposed by both banks and the operators of the interbank regional networks. Since we are living in the age of computer hackers and thieves with relatively sophisticated electronic and data processing capability, most of the security requirements have been focused on the main security feature of such ATM networks, i.e., the PIN. Typically, the transaction network requires at least the following constraints on personal identification numbers. In order to prevent interception of a reproducible complete set of data identifying a bank transaction, the networks typically require that there be no transmission in the clear of a personal identification number. This leads to a requirement that the PIN somehow be encrypted at the terminal. Additionally, many networks require that all ATM or other point of sale transaction terminals connected to the network encrypt the PIN solely with a hardware encryption device in the keypad through which the PIN is entered into an ATM. In other words, it is not acceptable to accumulate the PIN in memory and then perform an algorithm operating software that encrypts same. This is done principally to prevent any unauthorized personnel from gaining access to the PINs via the telephonic connection thereto and knowledge of the operating system driving the ATMs. Thus, many network operators require a hardware encryption device be interposed between the keypad keys and any microprocessor controlling the ATM terminal equipment.

Additionally, most networks preclude storage of customer PINs either in the clear or in an encrypted form in transaction processors. Thus, the only location at which the actual PIN can be stored is in the customer account records of the bank maintaining the account, which records are on a machine that ultimately provides the authorization for any particular transaction.

While the foregoing discussion of the background of this invention has focused on automatic teller machines, because of their ubiquitous and familiar nature and their characteristic of dispensing cash, they are not the only type of device for effecting electronic funds transfer that requires the security of a PIN. Check acceptance systems have used similar arrangements at similar terminals. Additionally, there is growing use of point of sale terminals (POST) for directly debiting accounts using debit cards or ATM cards. While an immediate debit transaction is disadvantageous to the customer in that they lose the float on the credit card billing cycle, it keeps the seller involved in the transaction from having to pay the surcharge typically required by credit card companies and thus, allows them to provide their goods or services at a lower cost.

In addition to transactions through secure ATM machines and the like, significant volumes of business are transacted in the United States via telephonic placement of orders with verbal authorization for payment by a charge to a credit card account.

Mail order credit card transactions are archetypical unsecure financial transactions. Typically, a customer wishing to place an order contacts a seller by telephone. A credit card number, account name, and expiration date, all of which appear on the face of the credit card, are usually provided verbally to an order taker, together with the items ordered and information concerning shipment. Most sellers of goods that accept telephonic credit card orders will ship to an address other than the billing address associated with the credit card account. This has led to numerous problems including aggregate significant monetary losses to the credit card companies, with the purchase of goods using stolen credit cards or purloined credit card information.

Since secure terminals having hardware encryption devices are relatively expensive, and located in only a small number of locations, it is highly desirable to provide apparatus for, and a method of, making electronic funds transfers or other financial transactions from unsecured terminals that make use of the existing regional authorization networks and bank computers and records, including the use of personal identification numbers, yet provide a level of security close to or equal to that provided by the constraints imposed by typical regional banking networks in the prior art.

SUMMARY OF THE INVENTION

The present invention includes a method and apparatus for addressing the above stated need. Broadly stated, the present invention may be thought of as providing a secure transaction processor that meets the security requirements of typical regional banking networks in connection with the transmission and storage (or actually non-storage) of PINs, yet provides security to the account holder that prevents fraudulent transactions using the account. Broadly stated, it substitutes the combination of a secure transaction processor upon which a customer and his or her account have been registered, together with an unsecure point of sale terminal, for preexisting relatively expensive secure point of sale terminals such as automatic teller machines that include hardware encryption apparatus. The basic arrangement of the apparatus of the present invention includes a secure transaction processor having a record for each customer that includes certain information described hereinbelow. The system allows the customer to conduct electronic funds transfer (EFT) or other important financial transactions from an unsecured terminal, such as a swipe reader, with a simple nonencrypted keypad or a telephone set with a dual tone multifrequency (DTMF) keypad. DTMF keypads are also referred to as touch tone keypads. Through examples used in the balance of this specification, either masculine or feminine gender will be attributed to a particular exemplary customer to avoid the recitation of alternative pronouns of each gender.

Assume for the moment that a customer wishes to register with a mail order retail establishment for immediate debit or secure credit card transactions. The method of creating the necessary record for the secure transaction processor commences with the customer presenting herself at a locale at which a secure point of sale terminal device is available in order to conduct the registration process. Alternately, registration may be accomplished over unsecure phone lines using DTMF keypads if sufficient security for the transmission of critical data, including the PIN, can be accomplished. Thus, subject to practical limits on the security of actual transmission of DTMF signals representative of critical data such as personal identification numbers, the registration steps of the present invention may be accomplished from an unsecured terminal.

The customer is first prompted to insert her bank account or credit card into the reader of the secure point of sale transaction terminal. Machine readable account information is read from the magnetic stripe on the card. The customer is then prompted to enter her PIN in a manner thoroughly familiar to users of ATMs. Upon entry of the PIN, it is hardware encrypted with the secure point of sale terminal's existing hardware encryption apparatus. This transmits account information read from the card and an encrypted representation of the PIN over data communication lines to the secure transaction processor at which the record of the registration process is to be maintained. Certain parts of the account information and the encrypted PIN are passed over a regional network system in an altogether conventional fashion to determine the validity of the PIN that has been provided at the secure point of sale terminal, just as it is in conventional ATM transactions.

On the assumption that the PIN is valid, the secure transaction processor then prompts the customer for entry of a telephone service access number that is uniquely associated with a customer. In most cases this will be the customer's social security number, although other numbers uniquely associated with the customer, or at least a particular account, may be employed.

Upon completion of this much of the process, the encrypted PIN provided from the secure point of sale transaction terminal is parsed into first and second portions. In preferred forms of the present invention, the first portion is examined character by character for non-numeric characters that result from the encryption algorithm used by the terminal. If non-numeric characters exist in the first portion, they are masked by numeric characters on a one-to-one relationship with particular non-numeric characters. At the same time, a service security translate key (SSTK) is created that has a particular bit value at each position at which a character has been masked in the first portion of the encrypted PIN. The masked first portion is then transmitted back to the customer at the secure point of sale terminal together with prompting information encouraging the customer to remember this access code.

The preferred method of parsing the encrypted PIN into first and second portions is to use a pseudo random number generator to select a random number between 1 and N for an N character encrypted PIN. When this number is selected, the next contiguous M characters (M being less than N) are selected as the portion to the masked and returned to the customer. It should be noted that if the end of the encrypted PIN string is reached, the concept of M contiguous characters, as used in this specification, loops around to the beginning of the encrypted PIN.

Additionally, the apparatus retrieves from a network security transaction processor the current working encryption key that was used by the secure point of sale terminal to encrypt the customer's PIN. As is known to those skilled in the art, working keys are the keys employed by regional networks and the keys used directly at the secure point of sale terminal such as an ATM machine. The working keys are changed dynamically, for example once a day or several times a day under the control of the network security transaction processors, conventional existing machines that are used in the practice of the preferred form of the present invention. As is known to those skilled in the art, the working key is not the only level of encryption that is provided by such machinery. However, the customer record to be maintained, for practice of the present invention, needs information from which it can derive the working key that was used to encrypt the customer's PIN at the time the encrypted PIN was created and parsed, as described above.

A customer record is then created at the secure transaction processor that includes the telephone service access number (social security number in the example) as the record key. The record also includes the second portion of the parsed encrypted PIN, the encryption key or data identifying same that was used in the encryption process by the secure point of sale transaction terminal, the service security translate key, an indication of the random number identifying the starting position of the first portion of the encrypted PIN within the entire encrypted PIN, and any other desired or needed account data read from the customer's account card. It may be desirable, although it is not critical to the present invention, to store other data in the customer record, such as that from the track 2 of the magnetic stripe, in some type of encrypted form for added security.

The customer is now registered at the secure transaction processor and may conduct sensitive financial transactions in the future via unsecured terminals, which transactions have a very high level of security.

In its broadest form, an encryption algorithm may be chosen that does not lead to non-numerical characters in the encrypted PIN. However, the preferred form is to account for this since encryption algorithms typically in use employ a coding scheme in which each four bit combination represents a hexadecimal digit 0–F.

Another aspect of the method of conducting transactions of the present invention is for the customer to contact the secure transaction processor to, for example, order a particular item through a catalog. Assume for the moment that same is conducted at the secure transaction processor solely through automated attendant apparatus that prompts the customer to input certain data through a DTMF keypad of a conventional telephone set. The system can be arranged so that ordering information, such as an identification of the items, quantity, the size, etc., is provided either before or after provision of the financial information through the secure transaction processor. However, all of the order information will need to be accumulated prior to requesting authorization from an authorization processor over a regional banking network so that the total amount of the transaction can be included in the data that is ultimately provided to the authorization processor at a bank or credit card operator's office. The user is first prompted for her telephone service access number which is the record key string for the customer record at the secure transaction processor practicing the present invention. The customer then provides this number via the DTMF keypad on her telephone set.

Assuming that a record exists indicating that the customer is registered, the processor then prompts the user for her account access number which is, as noted above, the masked first portion of the encrypted PIN created during the registration process. This numeric data is entered via the keypad and travels over the telephone line to the secure transaction processor.

The transaction processor then accesses the service security translate key from the customer's record and uses same to unmask the particular character positions that are indicated as having been masked to numeric data by the SSTK. The resultant unmasked first portion is then concatenated with the stored second portion from the customer record to recreate the original encrypted PIN. This encrypted PIN, together with the stored encryption key that was originally used to create same, is transmitted, together with other account information and transaction information to a conventional network security transaction processor. Note that any information stored in the customer's record identifying which particular characters were used for the first portion of the encrypted PIN provided to the customer is used at this time to recreate the original (as of registration time) encrypted PIN in the proper order.

The conventional network security transaction processor will need to be programmed or instructed to accept a particular command to receive both the encrypted PIN and its encryption key and to use that particular key to de-encrypt the PIN before commencing conventional transaction processing. Once the PIN has been de-encrypted using the stored key that is transmitted to the network security transaction processor, the PIN is re-encrypted using a current key and a request for authorization is transmitted over the regional network. Note that this latter aspect of the process is entirely conventional since typical existing systems de-encrypt the encrypted PIN provided by an ATM machine and re-encrypt it using a regional key for transmission over the network. It should be understood that, in summary, the method of the present invention constitutes both the registration and the use steps described above. The apparatus of the present invention constitutes the apparatus that is used with and actually performs the steps described.

It should be noted from the foregoing description that this system meets the PIN security requirements of regional banking networks as follows. First, there is no storage anywhere in the secure transaction processor or any point of sale terminal of any customer's PIN, either in the clear or in an encrypted form. The only stored information with respect to the PIN is the portion of the customer's encrypted PIN that is stored at the secured transaction processor. Additionally, there is no transmission of the PIN in the clear as only a masked first portion of the encrypted PIN is transmitted in the clear over the telephone lines as the customer's access code. Therefore, this method and apparatus provides secure electronic funds transfers and other secure financial transactions from unsecure terminals, including conventional telephone sets, without compromising the conventional security rules of regional banking transaction networks.

It should be noted that the secure transaction processor can physically be located almost anywhere desired by the transaction generating entity, including a computer located on its premises or at a telephone company central office. It is preferable to practice invention using central office equipment that provides verbal or encoded data prompting to the customer and also maintains the customer records described above.

Thus, it should be understood that it is an object of the present invention to provide a method and apparatus of conducting electronic funds transfers and other financial transactions from unsecured point of sale terminals, including conventional telephone sets that has transaction security comparable to that provided by conventional secure point of sale transaction terminals.

It is a further object of the present invention to provide secure financial transactions from unsecure point of sale terminals which, through the use of a secure transaction processor, generate conventional authorization data, including a personal identification number associated with a particular customer and a particular account may be handled over conventional and existing regional banking authorization networks.

It is still a further object of the present invention to provide a method and apparatus of registering particular customers and particular accounts at secure transaction processors that may be used to transmit transaction specific information to regional banking networks, including a customer's PIN, without ever storing the customer's PIN, either in the clear or in encrypted form.

It is still a further object of the present invention to provide a method of and apparatus for conducting financial transactions that have a security level comparable to that provided by conventional secure point of sale terminal devices such as ATM machines, but still have the convenience of placement of orders and authorizations of transactions from an unsecure telephone set.

That the present invention meets these objects and fulfills the above described need from the prior art will be understood from the description of the preferred embodiment hereinbelow.

DETAILED DESCRIPTION

Figure 1:
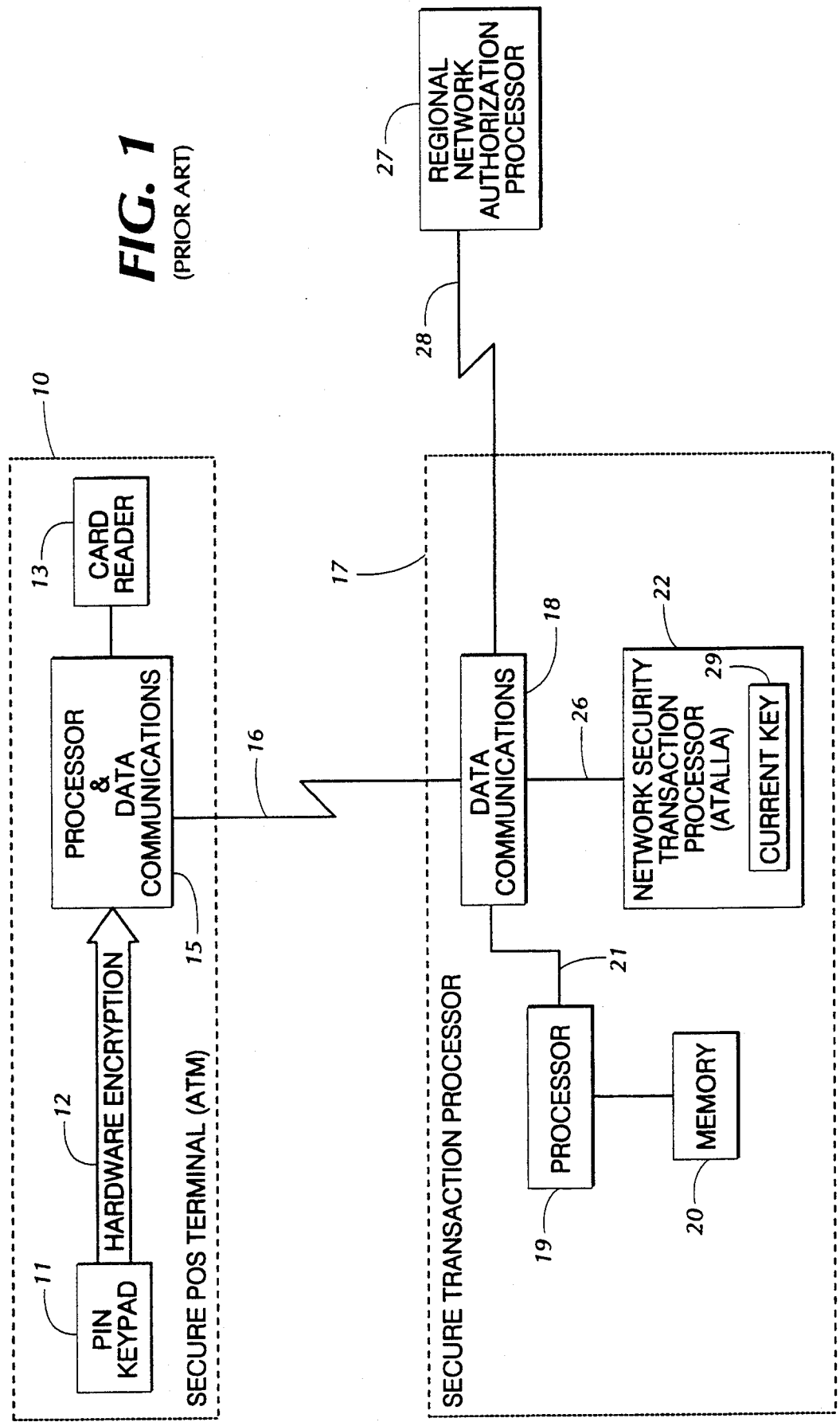
FIG. 1 is a block diagram of a prior an electronics funds transfer authorization system.

Turning now to the drawing figures in which like numerals reference like parts and steps, the preferred embodiment of the method and apparatus of the present invention will now be described.

FIG. 1 shows an existing electronic funds transfer (EFT) system. A typical representative system is one involving an automatic teller machine (ATM). The automatic teller machine 10 constitutes a secure point of sale (POS) terminal. It includes a numeric or alphanumeric PIN keypad 11 that is connected via hardware encryption apparatus, indicated at 12, to processor and data communications apparatus 15. Typically, hardware encryption apparatus 12 is embodied as wire connections between the contacts of the key switches of pad 11 and its output. It is normally apparatus integrally formed with the keypad apparatus. Therefore, it should be understood that the representation of a separate element 12 in FIG. 1 is intended principally to illustrate the function of the hardware encryption apparatus associated with the keypad. Apparatus 15 includes a conventional microprocessor and associated memory and apparatus for effecting data communications over data link 16 to a secure transaction processor 17. Data link 16 is typically embodied by a dedicated telephone line, leased line, or virtual connection through a commercial packet switch network. The structure of processor and data communications apparatus 15 is well known to those skilled in the art. It includes a UART and some form of modem for transmitting modulated representations of the data signal over data link 16.

As noted hereinabove, many of the regional banking networks require hardware encryption apparatus, such as that represented by block 12, to be employed in the PIN keypad embodying keypad 11. When the ATM 10 is prompting the user for his or her personal identification number, the encryption apparatus is activated.

Typically, a PIN is a four digit number. As is known to those skilled in the art, the encryption algorithms of the type employed by hardware encryption apparatus 12 are of the type described by the Data Encryption Standard (DES) promulgated by the National Bureau of Standards. In handling, these number are normally represented as binary coded decimal (BCD) four bit nibbles. Thus, digits 0–9 take values 0000–1001. When the BCD representation of a PIN is encrypted, any bit pattern may result and thus the four bit nibbles may take values between 0000 and 1111. Arithmetically, it is convenient to treat these as hexadecimal digits taking on values 0–F.

The encryption key that is employed by this encryption algorithm is typically 13 characters long, i.e., 52 bits. They are combined as specified in the DES with the PIN to produce an encrypted form of the PIN that is 16 hexadecimal digits long. Algebraic combinations of a key and other bit strings are sometimes used. For example, in some systems an algebraic combination of the customer's PIN and a bank card number, referred to as an PAN, may be employed in the encryption process. However, same is not necessary and the present invention will be described in terms of the direct encryption of a PIN. Throughout this specification, the PINs in their encrypted form are referred to as having a particular number of characters. In the preferred embodiment, each character is one hexadecimal digit. Furthermore, in the vernacular of this specification, the hexadecimal digits that correspond to decimal digits 0–9 are called numeric characters and hexadecimal digits A–F are referred to as non-numeric characters.

When the personal identification number is entered at keypad 11, transaction data representing information about the transaction the customer seeks to perform at ATM 10, together with the 16 character encrypted PIN, are transmitted over data link 16 to the secure transaction processor 17. Secure transaction processor 17 likewise includes data communication apparatus 18 that communicates with a microprocessor 19 with associated memory 20 arranged in the familiar architecture of an embedded microprocessor controller. The processor may be implemented as either an embedded microprocessor machine or a dedicated mini or mainframe computer for handling transactions from a plurality of secure POS terminals such as terminal 10. Processor 19 communicates with data communications interface 18 via lines 21. The network security transaction processor 22 communicates via lines 26 with the data communication interface 18. It thereby communicates with secure POS terminal 10 via link 16, and with a regional network authorization processor 27 via data link 28.

Similarly, processor 19 communicates with network security transaction processor 22 via lines 21, the data communications interface 18, and lines 26. It should be understood that communications with network security transaction processor 22 typically take place in a multiplexed format in which an instruction is provided followed by the data that relates to the particular instruction. However, other systems could be used in which separate instruction or control lines were provided on a device embodying the network security transaction processor.

Security transaction processor 22 includes a memory location represented by block 29 that stores the current encryption key used by the regional network to which authorization processor 27 belongs. Typically, the encryption keys are changed approximately every two to twenty-four hours and the identity of each new key is transmitted from authorization processor 27 via data links 28 and 26 to the security transaction processor 22 where it is stored at a predetermined location of memory indicated as 29.

In executing a typical transaction, the following sequence will take place. A customer inserts his bank card into card reader 13 where account information is read and communicated to processor 15. The customer is prompted to enter is PIN in PIN keypad 12. A four digit PIN is hardware encrypted into a 16 character encrypted PIN via hardware encryption apparatus 12. The customer is then prompted for other inputs reflecting the nature of the transaction that he wishes to make. When complete transaction information is assembled, the transaction data, together with the 16 character encrypted PIN are transmitted over data link 16 to transaction processor 17. The secure transaction processor takes care of necessary processing required by the operator of ATM 10. It ascertains whether the transaction involves an account of the bank that operates transaction processor 17 and ATM 10 or another client bank of a regional network with which such operator is affiliated. If it is the latter, the processor maintains a record of the transaction and notes that it has dispensed cash from its ATM machine to the customer of another bank based on the presentation to ATM 10 of a bank card from another banking institution.

If the transaction is, for example, withdrawal of cash from an account in another bank, the 16 character encrypted PIN and the encryption key that were provided over data link 16 are passed to the network security transaction processor 22. This device de-encrypts the PIN, and then re-encrypts same using the current key stored in memory 29 for transmission to a regional network authorization processor 27 over data link 28. Network security transaction processor 22 is typically embodied in Atalla Network Security Processor as currently manufactured by Atalla Corporation. Atalla Corporation is well known to those skilled in the art of secure financial transactions and is an affiliate of Tandem Computer Company.

While particular encryption keys used between Atalla Network Security Processors remain proprietary, the method of encryption is according to the data encryption standard (DES) promulgated by the National Bureau of Standards, as noted hereinabove. Furthermore, the generation and provision of working keys to be used by devices such as ATM 10 (FIG. 1) is performed in accordance with the documented instructions provided by Atalla. In particular, all of the information necessary to successfully use Atalla Network Security Processors is contained in a document entitled "Network Interchange Security Systems User' Manual" published by Atalla Network Security Systems and identified by its part number A34-MN-10150/10250. This document is a well known tool available to those skilled in the art of designing and operating secure financial networks and is additionally incorporated herein by reference exactly as if set forth in full.

Thus, it should be understood that while the identification of the particular keys used in processor-to-processor communications are maintained in a confidential manner, the methodology of the encryption according to the DES and the construction of a machine that maintains confidential keys is known to those skilled in the art.

As noted hereinabove, data communication link 16 is typically a dedicated line, leased line, or a link through a commercial packet switched network. However, for locations with a relatively low volume for an ATM such as ATM 10, data link 16 can be embodied by a dial-up line. The security requirements with respect to handling of personal identification numbers described hereinabove in the Background of the Invention section are principally requirements to prevent a party that taps or intercepts communications on either of data links 16 or 28 from ascertaining PINs associated with particular accounts. The requirements also prevent an unauthorized operator from accessing data stored in the memory associated with a processor and data communications apparatus 15 via data communications link 16 in order to identify PINs associated with particular accounts.

FIG. 1 describes the existing prior art systems for authorizing EFT transactions, both locally with secure transaction processor 17 and using regional banking networks. As noted hereinabove, it is a principal purpose of the present invention to provide both a method and apparatus for conducting transactions of equal sensitivity from unsecure terminals, rather than requiring a secure point of sale terminal such as terminal 10. These transactions are conducted in a manner that has both a very high level of security and satisfies certain security requirements of regional banking networks with respect to the handling of PIN data.

Figure 2:
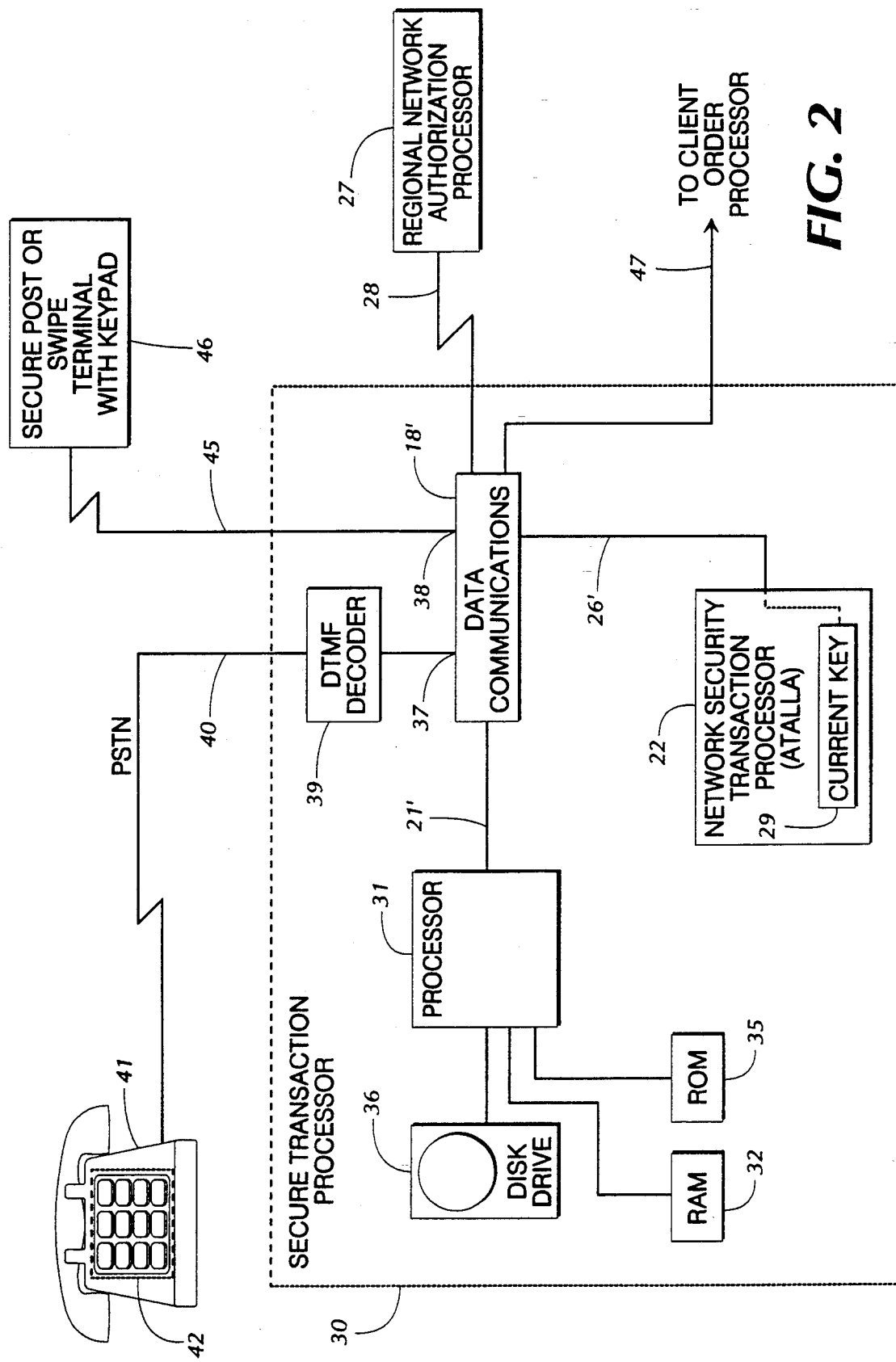
FIG. 2 is a block diagram of a financial transaction authorization system of the preferred embodiment.

Turning next to FIG. 2, a block diagram of apparatus embodying the present invention is shown. It includes a secure transaction processor 30 of similar general architecture to prior art transaction processor 17 which, however, functions differently in several important respects. An Atalla network security transaction processor 22 is also included in the secure transaction processor 30 of the preferred embodiment. It should be noted that conceptually, the network security transaction processor may be considered as included within, or external to, the secure transaction processor when analyzing the present invention at a system level. It is important that the function performed by the network security transaction processor apparatus be performed, but it is not critical whether same is considered to be a part of the security transaction processor or an external processor.

Secure transaction processor 30 includes a microprocessor or other CPU apparatus 31 with associated external random access memory (RAM) 32 and read only memory (ROM) 35 connected thereto. Additionally, magnetic memory is provided by a disk drive shown as 36 for storing customer registration records as described in greater detail hereinbelow. Of course, other storage media may be employed in embodiments of the present invention but relatively large hard disk drives are currently preferred.

Transaction processor 30 includes a data communications interface 18' that communicates via data link 26' with the network security transaction processor 22 in a manner identical to that of the prior art illustrated in FIG. 1. The preferred embodiment includes speech synthesizing apparatus. Typically, the data communications interface 18' will be a multiport device that can handle a plurality of transactions at any given time. Two representative input ports are shown as 37 and 38 in FIG. 2.

Port 37 is connected to a DTMF decoder 39 that is, in turn, connected to a subscriber line 40 that forms part of the public switched telephone network (PSTN). In FIG. 2, subscriber line 40 is shown as connected to a typical telephone set 41 having a DTMF keypad 42 by which the user can transmit numeric information to transaction processor 30. As will be apparent to those skilled in the art, the function DTMF decoder 39 may also be implemented by an external DTMF decoder that passes decoded data to secure transaction processor 30 or by apparatus which allows processor 31 to directly decode inbound DTMF signals.

Port 38 is connected to a modem within data communications interface 18'. Its input is data link 45 that may be embodied by a connection via the public switched telephone network, commercial packet switched network connection, or dedicated phone lines.

Data link 45 is connected to terminal equipment that, in the preferred embodiment, is embodied by a swipe terminal with a keypad 46 of the type known to those skilled in the art or a secure terminal similar to ATM 10 (FIG. 1). A swipe terminal has a swipe reader for reading the information stored on the magnetic stripe of a bank card and a keypad by which numeric data may be entered by an operator.

The examples of telephone set 41 and terminal 46 are not intended to be limiting of the type of terminal equipment that may be used in a system embodying the present invention. Indeed, data terminal equipment including computer devices, dumb terminals, and other apparatus are contemplated as devices that can communicate with the secure transaction processor 30 of the present invention. In the preferred embodiment, terminal 46 is one of the types of devices used for customer registration on the system and execution of financial transactions by a registered customer.

In the preferred embodiment of the present invention, registration will take place at a terminal 46 with data link 45 representing a direct connection to the secure transaction processor 30. Thus, the terminal and the processor would be on site at the location where registration was taking place. This is to prevent transmission over telephone links, which is susceptible to interception, of a customer's PIN.

Alternately, registration takes place using a secure point of sale terminal such as terminal 10 shown in FIG. 1 which can communicate over data link 45 with transaction processor 30, and which will only transmit encrypted forms of a customer's PIN.

As noted briefly hereinabove, secure transaction processor 30 may be one of a plurality of processors located at various locations, or a central computer operated by the client of the regional network. In this specification, the client of the system is the entity that will be receiving the electronics funds transfer authorized by its customer. Thus, the customer is the party that owns the bank account and the client is the party to whom the customer wishes to transfer funds. Alternately, the secure transaction processor may be embodied by any form of specialized computer that is connected to or forms a part of central office switching equipment by a telephone company. One example of same are service circuit nodes that connect directly to electronic switching equipment for a central office such as those manufactured and sold by American Telephone & Telegraph Company.

Another data link 47 is shown as coming from data communications interface 18 and going to a client order processor. This link is typically an asynchronous serial link or a connection via local area network. Alternately, an asynchronous link may be connected to a modem for transmission of order information to a computer at a remote site. Of course, the computer that constitutes secure transaction processor 30 may also perform the function of a client order processor. A client order processor is contemplated when, for example, the system is being used by a mail order retail operation. Disk drive 36 holds customer records for registered customers and also maintains information on customer transactions.

Having described the physical structure of the preferred embodiment shown in FIG. 2, the methods of registration and execution of a transaction in accordance with the preferred embodiment of the present invention will now be described in connection with FIGS. 3 and 4. Reference will also be made to FIG. 2 during this discussion in order to indicate the particular apparatus that performs certain steps of the method in the preferred embodiment.

Figure 3:
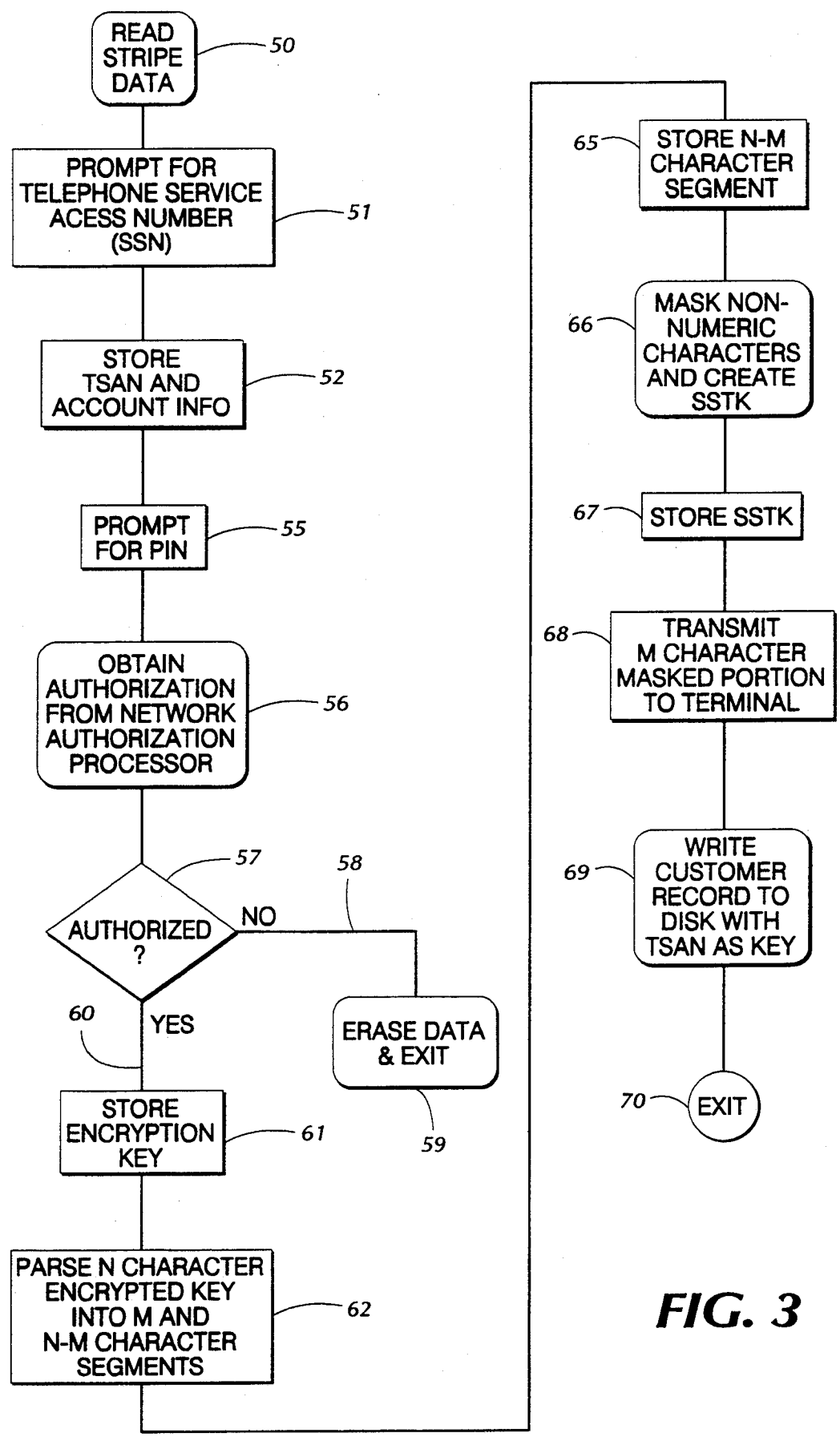
FIG. 3 is a high level flow chart of the process of registering a customer on the system of the preferred embodiment.
Figure 4:
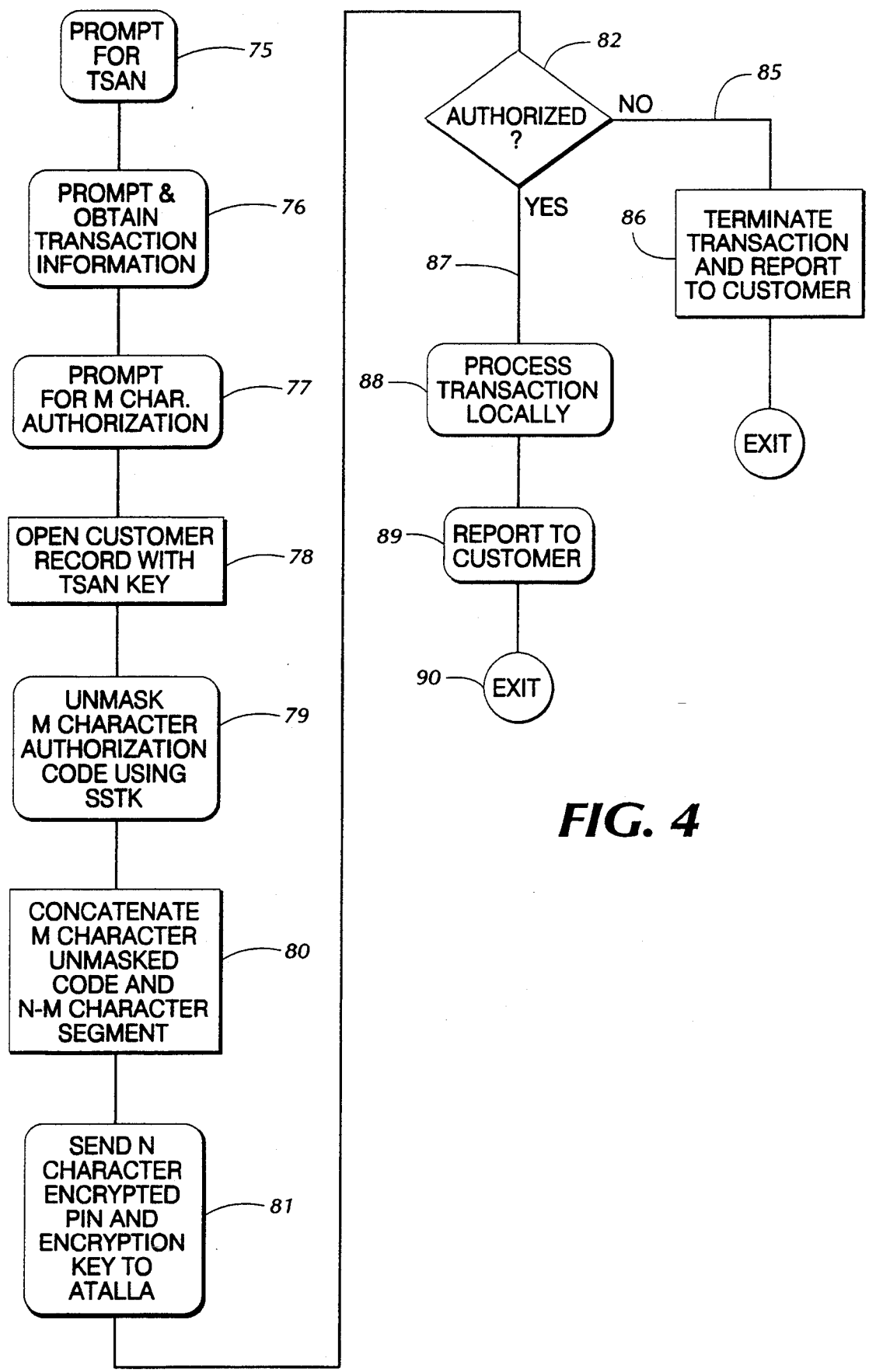
FIG. 4 is a block diagram showing the method of conducting a transaction according to the preferred embodiment of the present invention.

FIGS. 3 and 4 are high level flow charts of the logic that controls processor 31 within secure transaction processor 30. The writing of computer code to implement these steps, for a given type of processor and operating system, will be apparent to those skilled in the art. Selection of a processor and a language in which to write such instructions, are matters of design choice.

Preferably, coded instructions for performing the methods shown in FIGS. 3 and 4 are burned into read only memory 35 and such instructions are fetched by processor 31 in a well known conventional manner. Alternately, such instructions may be stored on disk drive 36 and loaded into random access memory 32 for execution.

FIG. 3 shows the method of registration used in the preferred embodiment. This is preferably accomplished with a secure point of sale terminal, such as ATM terminal 10, embodying terminal 46 and being connected to communication link 45 shown in FIG. 2. After appropriate prompting to the customer and the customer's selection of a registration function, the magnetic stripe data is read by the point of sale terminal at step 50. At step 51, processor 31 causes a message to be sent over data link 45 prompting the user for a unique identifier that will serve as a telephone service access number (TSAN) in conducting future transactions. The method of the preferred embodiment uses the TSAN as the record key in the customer records stored on disk drive 36. Therefore, it is important to have the user select a number that is uniquely associated with her. The most apparent choice is an individual's social security number and that is what is used in the preferred embodiment, although other numbers or strings of alphanumeric characters may be employed in embodiments of the present invention.

On the assumption that the user enters same, data representing the telephone service access number is acquired and stored at step 52, together with account information that was read from the magnetic stripe of the bank card at step 50.

At step 55, the customer is prompted for entry of her PIN. In the example described, the PIN will be encrypted via hardware encryption apparatus 12 (FIG. 1) and the 16 character encrypted PIN is transmitted to secure processor 30 (FIG. 2) in a conventional fashion. It should be noted that the preferred embodiment of the registration process illustrated in FIG. 3 is one in which secure transaction processor 30 (FIG. 2) generates prompts to the user during the registration process. It will be apparent to those skilled in the art that the prompting steps can be performed either locally under a local prompting control program, at terminal 46 (FIG. 2) with all accumulated data being sent in one group or a packet after the customer has been prompted for all necessary entries.

Step 56 represents a routine for obtaining authorization from a network authorization processor. This routine includes the steps of passing the 16 character encrypted PIN to the network security transaction processor 22. There it is de-encrypted and re-encrypted using the current key of the regional network stored in memory location 29. The re-encrypted PIN together with other transaction specific information is then passed over data link 26' to processor 31. Processor 31 in turn transmits the information on to regional network authorization processor 27, which information includes the re-encrypted PIN, to confirm the correspondence between the particular account identified from the magnetic stripe data at step 50 and the PIN entered by the customer in response to step 55.

At step 57, processor 31 tests the data that is returned by the regional network authorization processor 27 over data link 28 to see if the transaction is authorized, i.e., whether the PIN for the account has been correctly entered at the terminal. If the result of this test is negative, NO branch 58 is taken and the data acquired heretofore is erased and the routine is exited at step 59. If the network authorization processor 27 reports an affirmative result for the PIN, YES branch 60 is taken to step 61.

At step 61, the encryption key provided by the network security transaction processor 22 is stored. It should be noted that the encryption key used during the encryption of the customer's PIN by terminal 46 when the PIN is first entered during the registration process is provided to processor 31 by network security transaction processor 22. In the preferred embodiment of the present invention, secure transaction processor 30 monitors the provision of new working keys to terminals such as terminal 46 and thus, has information about the particular key that is used to encrypt the customer's PIN while registration is taking place. Alternately, commands can be issued to network security transaction processor 22 to identify the working key currently in use by each particular remote terminal (or all remote terminals connected to the processor). The necessary point to be understood is that processor 31 must have some indication of the key that was actually used in the process of encrypting the PIN while creating the customer's record described herein.

Thus, to this point, data identifying the customer's bank account, the customer's telephone service access number (normally social security number) and the encryption key used to encrypt the 16 character encrypted PIN originally transmitted by the terminal are in the system. The routines at step 62 create the field entries for the registration record that provide the very high level of security while still providing a service that can use the existing network security transaction processors and the PINs associated with particular bank accounts at the account records maintained by the bank's computer.

At step 62, the 16 character encrypted PIN is parsed into a first segment of seven characters and a second segment of nine characters. In the drawing, step 62 references an N character encrypted key and parsing same into M and N−M character segments. To practice the present invention, it is clear that N must be a positive integer greater than one, although a two character encrypted PIN would provide a relatively low level of security. M must also be a positive integer and it must be less than N. From this description, it will be apparent that, in the preferred embodiment, N=16 and M=7. Of course, other combinations of N and M may be used in methods that practice the present invention.

As noted hereinabove, the preferred mode of parsing the 16 character encrypted PIN is to use processor 31 to generate a pseudo random number R, which number defines a beginning point for the M character first portion of the PIN to be provided back to the customer. The number R is a positive integer having values in the range [1,N]. The next contiguous M characters, beginning with the Rth are chosen to be the M character first portion. Note that if there are less than R characters to the right of the starting position in the 16 character encrypted PIN, the selection of the M characters wraps around to the beginning. The remaining parts of the original 16 character encrypted PIN are then concatenated to form the N−M character second portion that is stored in the customer record on this disk drive 36.

Thus, it will be apparent that if R is less than or equal to (N−M+1) then all M characters may be selected from a contiguous portion of the original N character encrypted PIN without wrapping around. If this relationship is not satisfied, the last (N−R+1) characters (beginning at the Rth position) are selected as the first characters and these are followed by the first (M−N+R−1) characters from the beginning of the N character encrypted PIN.

The reassembly of the original N character encrypted PIN from knowledge of the values of N, M, and R, will be apparent to those skilled in the art. The use of the random number to select this circular parsing point for selecting the first M characters of the N character encrypted PIN adds additional security to the system.

At step 65, the nine character second segment of the encrypted PIN is stored in the buffer in which the customer record is being assembled. It should be noted that this constitutes part, but not all, of the encrypted PIN. Thus, this segment, together with the encryption key, cannot be used to derive any meaningful information about the actual PIN that gave rise to the encrypted PIN. As is well known to those skilled in the art, the encryption algorithms of the type employed are such that the entire PIN, as well as the entire encryption key, potentially impact each hexadecimal character. Thus, it is not possible to recover part of the PIN from a knowledge of an incomplete version of the encrypted PIN and the encryption key.

At step 66, the masking of the first seven character segment that is employed by the preferred embodiment takes place. There are two desirable effects from this. First, it provides increased security in providing (at least in a significant fraction of cases) a service access number that is not part of the actual 16 character encrypted PIN. Secondly, it is believed preferable for customers to have only numerical characters to remember as part of an access number for using the system of the preferred embodiment.

As noted hereinabove, characters used in the context of this specification are hexadecimal digits. Thus, in order to provide a decimal digit character for each character position, hexadecimal digits having values A–F must be masked. The preferred embodiment masks these characters according to the following table.

A=2
B=3
C=4
D=5
E=6
F=7

Of course, other masking relations may be used. If the security feature of the masking is considered desirable, the table used may be changed according to other criteria, such as date of registration, in order to make decipherment of the encrypted PIN even more difficult for a person having unauthorized access to the customer records.

It should be noted that the above referenced table is one that simply complements the most significant bit of the hexadecimal digits for values greater than nine. Therefore, the masking can be easily processed by changing the most significant bit from 1 to 0 for hexadecimal digits A–F which is arithmetically the equivalent of subtracting 8.

In the routine represented at 66, a record of the particular characters that are masked is generated and maintained in a service security translate key (SSTK). This is preferably a single eight bit byte, seven bits of which are used to record, on a bit-by-bit basis, the positions of the seven character access number that were masked. A 1 is inserted at each bit position for which masking takes place and a 0 is inserted at character positions for which there is no masking. For example, if the seven character first segment of the encrypted PIN was 12A34F5, the system would mask the A and the F characters. The resulting masked first segment would become 1223475. Since characters at the third and seventh positions (from left to right) were masked, the seven significant bits of the service security translate key that results from this operation would be 0010010. Thus, the service security translate key is available, as will be described in connection with FIG. 4, to reverse the process of masking in order to reassemble the encrypted PIN originally generated during the registration process.

At step 67, the service security translate key is stored in the buffer. At step 68, the masked seven character portion of the encrypted PIN is transmitted to the terminal together with instructions to the customer to make note of same and preferably to memorize it for use as an access number when conducting transactions on the system. It may be desirable to implement step 68 by encrypting the M character first portion prior to transmission over data link 45 to terminal 46. If this is employed, terminal 46 will need to be equipped to de-encrypt the N character portion so that it may be displayed in the clear to the customer. Either specific encryption accomplished by processor 31, or the service of encryption provided by network security transaction processor 22 may be used in such an implementation of this step.

The routine at step 69 writes the customer record to disk 36 with the telephone service access number (social security number) as the record key string that is used by the index of the data base storing customer records as the key to locate this particular customer's record of registration. When this is completed, the routine is exited at 70 and the customer's registration is complete.

It should be noted that while it is preferred to mask the non-numeric characters of the M character (7 in the preferred embodiment) first segment as shown at steps 66 and 67, this is not necessary in order to practice the present invention in its broadest form. The main security advantages from parsing an encrypted PIN and passing a first segment of it back to the customer and storing a second segment of same are available in a system that omits the masking and unmasking steps.

Furthermore, it should be understood that it is important to use a secure point of sale terminal in order to accomplish the registration process without having that process itself becoming a potential breach of the security of the system. However, in addition to conventional secure point of sale terminals such as ATMs and other devices employing hardware encryption, a swipe terminal that employs adequate encryption or a terminal that is connected only locally (i.e., without any intervening transmission through the telephone network) also qualifies as a secure terminal for the method of registration of the present invention.

Turning next to FIG. 4, the process of conducting a transaction by a registered customer is illustrated in a high level flow chart. Again, this chart represents the sequential steps executed by processor 31 of secure transaction processor 30. In this example, it is assumed that the customer who became registered in FIG. 3 wishes to place an order for a particular item over her telephone and to debit her bank account at the time the order is placed. Thus, in the example described, the financial transaction will be originated and controlled via the use of telephone set 41 with its DTMF keypad 42 shown in FIG. 2. It should be understood that this is not limiting of the type of unsecure terminal (or a secure terminal) that can be used to execute a financial transaction for a registered customer. Thus, text transmitted via modems can be used on terminals and computers or other devices may be available, limited only by the types of appropriate interfaces that are implemented and supported by secure transaction processor 30.

In the present example, it should be understood that DTMF decoder 39 is operative to detect the presence of DTMF signals on line 40 and to pass on digital indications of same, when present to port 37. Also, port 37 includes an audio link between data communications interface 18' and subscriber line 40. In this example, data communications interface 37a includes a limited vocabulary speech synthesizer for generating audio prompts to subscriber line 40 that are audible at standard telephone set 41. The technology for such speech synthesis is well known to those skilled in the art and need not be described in detail.

With that background, assume that the user has taken telephone set 41 off hook and dialed an appropriate number to become connected to secure transaction processor 30 in order to conduct a financial transaction over the telephone. Assume she wishes to place an order for a particular item and have her bank account debited for same. At step 75, processor 31 and data communications interface 18' interact to cause the interface's speech synthesizer to audibly prompt the user to enter her telephone service access number. Assuming same is entered properly at keypad 42, this is stored, and control moves to step 76 at which audible prompts are provided for entering transaction information. For example, a request may be made for the user to enter an item number, followed by a request that a number be entered indicative of the number of units to be purchased, followed by codes for size, color, etc., for items to which such parameters apply. These are stored by processor 31 in RAM 32 in response to signals identifying decoded touch tones from DTMF decoder 39.

When this is completed, the user is verbally prompted to enter her seven character access code. When this access code is obtained, the processor opens the customer record with the TSAN as the identifying key at step 78 and is ready to complete processing of the order. The service security translate key (SSTK) is retrieved from the customer record on disk drive 36 and is used to unmask the masked characters by reversing the masking process described hereinabove in connection with the registration process of FIG. 3. This step is illustrated by routine 79 in FIG. 4.

When this is completed, the secure transaction processor has the unmasked seven character (M character) first portion of the original 16 (N) character encrypted PIN and the nine character (N−M) second portion that is stored in the customer record in disk drive 36. These are concatenated at step 80 to recreate the original encrypted PIN that was used during the registration process. Routine 81 sends the 16 character encrypted PIN and the original encryption key, also obtained from the customer record, to the network security transaction processor 22 via data link 26'. Note that the routine illustrated at 81 transmits data to the processor 22 that, for purposes of processor 22, is completely transparent to the fact that it was created by taking the masked seven character segment entered at keypad 42, unmasking same and combining it with the nine character segment stored on disk drive 36. The Atalla processor 22 need only be provided with the encrypted PIN and the encryption key used during such encryption and it will respond to this as it would any other request for service.

Therefore, when executing the routine illustrated at 81, the Atalla processor de-encrypts the customer PIN and re-encrypts same using the then current encryption key that is stored in the memory location 29 from the regional network it services. The re-encrypted PIN, together with account and transaction information is then provided by the network security transaction processor 22, in a conventional manner, out over data link 28 to processor 31. Processor 31 in turn sends the request out over data links 21' and 28 to the regional network authorization processor, which in turn communicates with the customer's bank to process the transaction in a conventional fashion. Therefore, it should be understood that one of the significant advantages of the present invention is that secure transaction processor 30 and the unsecured terminal in the form of telephone set 41 act together to provide a secured system that mimics a secure point of sale terminal such as ATM 10 shown in FIG. 1. It accomplishes this mimicry and interacts with network security processor 22 and regional network authorization processor 27 in a manner that does not require either of these devices to provide any special response because of the source of the transaction data and request for service, except as noted above.

Returning to the example of the transaction, processor 31 reads data coming back over data link 28, in a conventional fashion to determine if the transaction was authorized. This takes place at step 82 shown on FIG. 4. If the customer's bank reports that the transaction is not authorized, NO branch 85 is taken to step 86, which terminates the transaction and reports the lack of authorization verbally to the customer.

Assuming the happier result of an authorized transaction, YES branch 87 is taken to step 88 at which the transaction is processed locally. This represents either processing of the order within secure transaction processor 30 or communicating the nature of the order out over data link 47 to a client order processor. In either instance, the debit transaction has been authorized and recognized by the customer's bank, and it is now simply a question of the mechanics of processing the customer's order to deliver the goods she desires. When the order is processed the customer is debited and an electronic transfer of funds into the client's (seller) account is made.

It should be noted that order processing steps, such as checking the availability of items in inventory and the like, can be performed during step 76 at which transaction information is obtained, giving the customer an opportunity to terminate the ordering process if particular items are not available or will require an unacceptably long time for delivery. Once local transaction processing has been completed, a verbal report is provided to the customer at routine 89. This is again done by having processor 31 drive the speech synthesizer within data communications interface 18' to generate the appropriate verbiage on subscriber line 40. Following this, the routine is exited at point 90, as the transaction has been completed.

While the foregoing embodiment represents the best mode contemplated by the inventor at the present time, there are other embellishments which could add additional security that are also being contemplated. It is unclear as of the time of the writing of this specification whether the additional security provided would tend to be cost effective. However, one example currently contemplated by the inventor is the employment of voice print identification as an additional parameter for authorizing a transaction. In such an embodiment, voice printing information would be acquired during the registration process and stored as part of the customer's record on disk drive 36. This would require analysis of a voice signal, which the customer would be prompted to speak during a purchase transaction, by voice print analysis routines running on processor 31. It is also possible to employ such voice print identification only in connection with transactions coming in over certain classes of telephone lines and to also allow placement of orders via modem over other classes, for example, calls passing through commercial packet switch networks.

Additionally, it may be desirable to periodically reencrypt and re-parse the customer's PIN and require the customer to call in and provide her TSAN to obtain the New M character portion.

From the foregoing, it will be appreciated that the method and apparatus of the present invention meet the above stated objects of the invention and fulfill the need in the prior art described hereinabove. In view of the detailed description of the preferred embodiment contained herein, other embodiments of both the method and apparatus of the present invention will suggest themselves to those skilled in the art and therefore the scope of the present invention is to be limited only by the claims below and equivalents thereof.

What is claimed is:

1. In a system for processing a financial transaction from a particular customer of the type requiring provision to a network security transaction processor of an N character encrypted PIN, N being a positive integer greater than one, and an encryption key, wherein said N character encrypted PIN is a representation of a PIN associated with a particular account and a particular customer that was encrypted using said encryption key, the improvement comprising:

means for establishing a data communications link between an unsecured point of sale terminal device and a secure transaction processor wherein said point of sale terminal device is operable to provide data representing an M character first portion of said N character encrypted PIN, M being a positive integer less than N, and a record key string associated with said particular customer;

said secure transaction processor including;

first memory means for storing an account record including said record key string associated with said particular account, an N−M character second portion of said encrypted PIN, and said encryption key in a record;

processor means connected to said memory means and to said data communications link for:

accessing said account record in response to receipt of said record key string, and combining said M character first portion and said N−M character second portion of said encrypted PIN to reproduce said N character encrypted PIN; and means for providing said N character encrypted PIN and said encryption key to said network security transaction processor.

2. In a system for processing a financial transaction from a particular customer of the type requiring provision to a network security transaction processor of an N character encrypted PIN, N being a positive integer greater than one, and an encryption key, wherein said N character encrypted PIN is a representation of a PIN associated with a particular account and a particular customer that was encrypted using said encryption key, the improvement comprising:

means for establishing a data communications link between an unsecured point of sale terminal device and a secure transaction processor wherein said point of sale terminal device is operable to provide data representing a masked M character first portion of said N character encrypted PIN, M being a positive integer less than N, and a record key string associated with said particular customer;

said secure transaction processor including;

first memory means for storing an account record including said record key string associated with said particular account, an N−M character second portion of said encrypted PIN, a service security translate key identifying each of said M characters that is a masked non-numeric character, and said encryption key;

processor means connected to said memory means and to said data communications link for:

accessing said account record in response to receipt of said record key string, combining said masked M character first portion of said N character encrypted PIN and said service security translate key to provide an unmasked M character first portion of said N character encrypted PIN, and combining said unmasked M character first portion and said N−M character second portion of said encrypted PIN to reproduce said N character encrypted PIN; and means for providing said N character encrypted PIN and said encryption key to said network security transaction processor.

3. A method of processing a financial transaction from a particular customer of the type requiring provision of a PIN associated with a particular account and said particular customer to an authorization processor comprising the steps of:

(a) registering said account at a secure transaction processor by;

(i) encrypting said PIN with a predetermined key to provide an N character encrypted PIN, N being a positive integer greater than one;

(ii) providing an M character first portion of said encrypted PIN to said particular customer, M being a positive integer less than N;

(iii) obtaining a record key string uniquely associated with said account;

(iv) storing said record key string and an N−M character second portion of said encrypted PIN in a record at said secure transaction processor;

(v) storing an indicia associated with said predetermined key at said secure transaction processor;

(b) contacting said secure transaction processor via an unsecured data link and providing said M character first portion of said encrypted PIN and said record key string over said data link;

(c) combining said M character first portion and said N−M character second portion of said encrypted PIN to reproduce said N character encrypted PIN at said secure transaction processor;

(d) obtaining said predetermined key and using same to de-encrypt said N character encrypted PIN to provide a reproduced PIN; and (e) causing said secure transaction processor to establish communication with said authorization processor, and to encrypt said reproduced PIN using a current authorization network key, to provide a re-encrypted PIN and other data associated with said particular account to said authorization processor.

4. A method of processing a financial transaction from a particular customer as recited in claim 3 wherein said step (a)(ii) includes the steps of:

identifying each of said M characters that is a non-numeric character, masking each said non-numeric character with an associated predetermined numeric character to provide a masked M character first portion of said encrypted PIN, and creating a service security translate key identifying the particular ones of said M characters of said masked M character first portion of said encrypted PIN that have been masked; and said step (a)(iv) includes a step of storing said service security translate key in said record at said secure transaction processor.

5. A method of processing a financial transaction from a particular customer as recited in claim 4 wherein:

said step (c) includes a step of accessing said service security translate key and using same to unmask said particular ones of said M characters of said masked M character first portion of said encrypted PIN that have been masked.

6. A method of processing a financial transaction from a particular customer as recited in claim 3 wherein said step (a)(ii) includes the steps of:

providing a random integer number R with a value in the range;

selecting said M character first portion of said encrypted PIN as the first M characters of said encrypted PIN beginning with the Rth character thereof; and said step (a)(iv) includes a step of storing said integer number R in said record at said secure transaction processor.

7. A financial transaction processing system for processing of the type requiring provision of a PIN associated with a particular account and a particular customer to an authorization processor comprising in combination:

means for establishing a first data communications link between an unsecured point of sale terminal device and a secure transaction processor wherein said point of sale terminal device is operable to provide data representing an M character first portion of N character encrypted PIN, M being a positive integer less than N, and a record key string associated with said particular customer, said N character encrypted PIN being encrypted using a predetermined encryption key;

a secure transaction processor including;

first memory means for storing an account record including said record key string associated with said particular account, an N−M character second portion of said encrypted PIN in a record, and said predetermined encryption key;

processor means connected to said memory means and to said first data communications link for:

accessing said account record in response to receipt of said record key string, combining said M character first portion and said N−M character second portion of said encrypted PIN to reproduce said N character encrypted PIN, using said predetermined encryption key to de-encrypt said N character encrypted PIN to provide a reproduced PIN; and network communication means for establishing a second data communications link between said secure transaction processor and said authorization processor;

second memory means for storing a current authorization network key provided by said authorization processor; and means for re-encrypting said reproduced PIN using said current authorization network key to provide a re-encrypted PIN and for providing said re-encrypted PIN and other data associated with said particular account to said authorization processor over said second data communications link.

8. A method of creating a secure record at a secure transaction processor which record is used for processing financial transactions from a particular customer having a machine readable account card associated with at least one particular account of said particular customer, and which account and customer have a PIN associated therewith comprising the steps of:

providing a secure point of sale transaction terminal with secured PIN pad encryption apparatus and card reading apparatus;

causing said secure point of sale transaction terminal to prompt said customer to insert said machine readable account card and reading account information stored on said account card;

causing said secure point of sale transaction terminal to prompt said customer to enter said customer's PIN and, in response to entry thereof, using said secured PIN pad encryption apparatus and a predetermined encryption key to provide an N character encrypted PIN, N being a positive integer greater than one;

causing said secure point of sale transaction terminal to prompt said customer to enter a telephone service access number uniquely associated with said customer;

transmitting said telephone service access number, said account information and said N character encrypted PIN to said secure transaction processor;

establishing communication with an authorization processor and verifying that said PIN is associated with said particular account;

parsing said N character encrypted PIN to provide an M character first portion of said encrypted PIN, M being a positive integer less than N, and an N−M character second portion of said encrypted PIN;

identifying each of said M characters of said M character first portion of said encrypted PIN that is a non-numeric character and masking each said non-numeric character with an associated predetermined numeric character to provide a masked M character first portion of said encrypted PIN;

creating a service security translate key identifying the particular ones of said M characters of said masked M character first portion of said encrypted PIN that have been masked;

creating a data record at said secure transaction processor including said telephone service access number as a record key string, said N−M character second portion of said encrypted PIN, data identifying said predetermined encryption key, and said service security translate key; and providing to said customer at said secure point of sale transaction terminal with said masked M character first portion of said encrypted PIN.

9. A method of creating a secure record at a secure transaction processor as recited in claim 8 wherein said step of parsing said N character encrypted PIN includes the steps of:

providing a random integer number R with a value in the range;

selecting said M character first portion of said encrypted PIN as the first M characters of said encrypted PIN beginning with the Rth character thereof; and said step of creating a data record at said secure transaction processor includes a step of storing said integer number R in said data record.

* * * * *